US009448320B2

(12) United States Patent
Ratcliffe et al.

(10) Patent No.: US 9,448,320 B2
(45) Date of Patent: Sep. 20, 2016

(54) ACOUSTIC ISOLATER FOR A DOWNHOLE TOOL

(71) Applicant: GE Oil & Gas Logging Services, Inc., Houston, TX (US)

(72) Inventors: James David Ratcliffe, Farnborough (GB); Timothy Gill, Farnborough (GB)

(73) Assignee: GE OIL & GAS LOGGING SERVICES, INC., Houston, TX (US)

( * ) Notice: Subject to any disclaimer, the term of this patent is extended or adjusted under 35 U.S.C. 154(b) by 293 days.

(21) Appl. No.: 14/092,170

(22) Filed: Nov. 27, 2013

(65) Prior Publication Data

US 2015/0146501 A1 May 28, 2015

(51) Int. Cl.
*G01V 1/44* (2006.01)
*G01V 1/52* (2006.01)

(52) U.S. Cl.
CPC ............... *G01V 1/44* (2013.01); *G01V 1/523* (2013.01)

(58) Field of Classification Search
CPC ......... G01V 1/44; G01V 1/523; E21D 23/26
USPC .......................................................... 367/25
See application file for complete search history.

(56) References Cited

U.S. PATENT DOCUMENTS

| | | | |
|---|---|---|---|
| 3,205,970 A | 9/1965 | Holmes et al. | |
| 3,982,606 A | 9/1976 | Berry et al. | |
| 4,066,995 A | 1/1978 | Mattews | |
| 4,446,539 A | 5/1984 | Von | |
| 4,872,526 A | 10/1989 | Wignall et al. | |
| 5,229,553 A | 7/1993 | Lester et al. | |
| 5,357,481 A | 10/1994 | Lester et al. | |
| 5,510,582 A | 4/1996 | Birchak et al. | |
| 5,728,978 A | 3/1998 | Roberts et al. | |
| 5,731,550 A | 3/1998 | Lester et al. | |
| 5,852,262 A | 12/1998 | Gill et al. | |
| 6,834,743 B2 | 12/2004 | Arian et al. | |
| 7,028,806 B2 | 4/2006 | Dubinsky et al. | |
| 7,216,737 B2 | 5/2007 | Sugiyama | |
| 8,270,251 B2 | 9/2012 | Drumheller et al. | |
| 2005/0167101 A1* | 8/2005 | Sugiyama ............... | G01V 1/523 166/249 |

OTHER PUBLICATIONS

PCT Search Report and Written Opinion issued in connection with corresponding Application No. PCT/US2014/063154 on Feb. 27, 2015.

* cited by examiner

*Primary Examiner* — Daniel L Murphy
(74) *Attorney, Agent, or Firm* — Bracewell LLP; Taylor P. Evans

(57) ABSTRACT

A downhole tool for acoustically imaging a subterranean formation having a transmitter and receiver and which includes an acoustic isolator between the transmitter and receiver. The acoustic isolator includes attenuation elements with rounded ends and that are connected in series by compression fittings. The compression fittings include sleeves that threadingly engage lock nuts and compressively engage the rounded ends. The contact interfaces between the compression fittings extend along a curved path thereby limiting acoustic transmission along the series of attenuation elements.

18 Claims, 4 Drawing Sheets

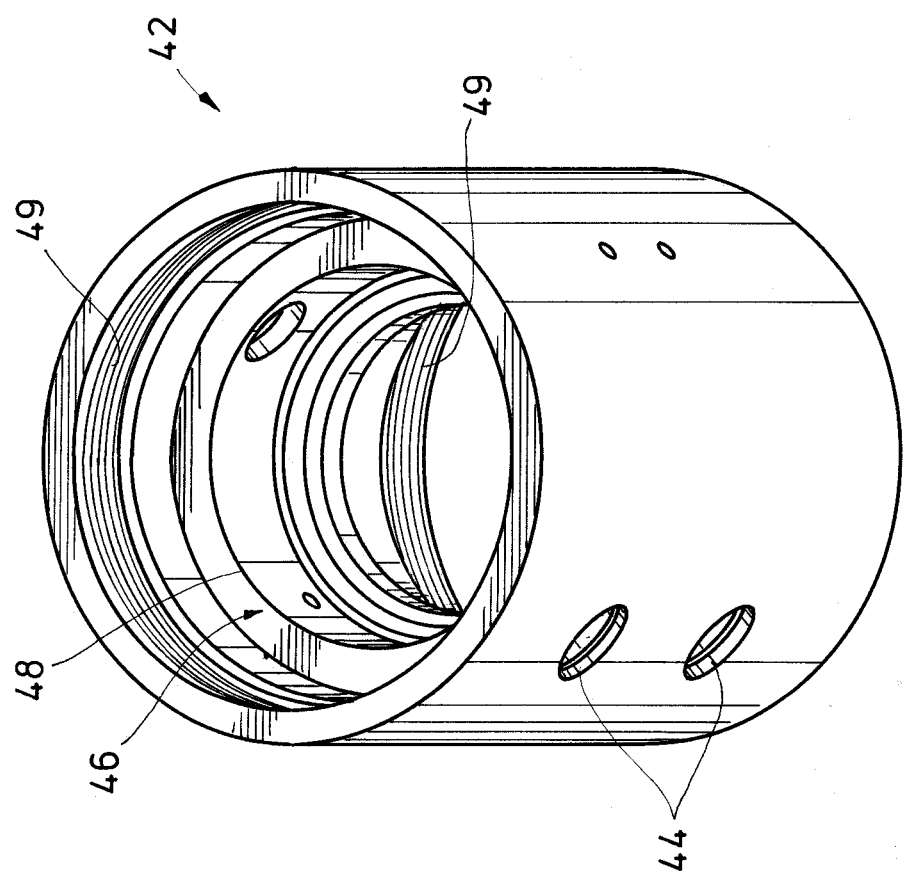
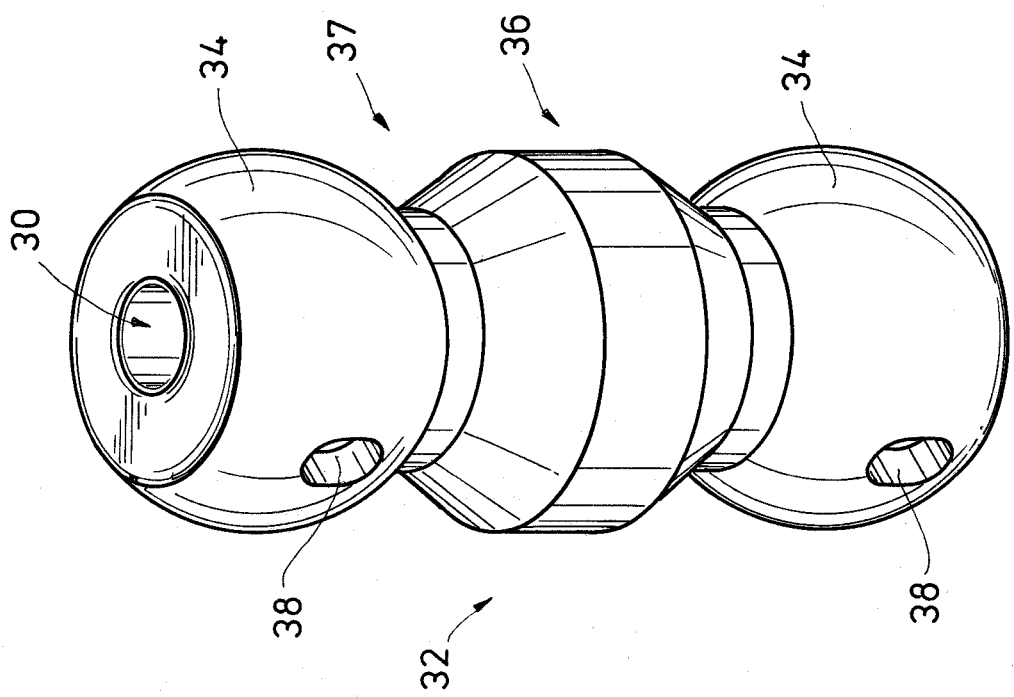

ACOUSTIC ISOLATER FOR A DOWNHOLE TOOL

BACKGROUND OF THE INVENTION

1. Field of Invention

The present disclosure relates in general to a system for use in imaging a subterranean borehole. More specifically, the present disclosure relates to a downhole imaging system having an acoustic isolator for attenuating acoustic signals in the system.

2. Description of Prior Art

Geological data concerning subterranean formations is often gathered with an imaging technique. The data obtained usually relates to formation resistivity, formation porosity and/or permeability, identification of formation strata and the like. Zones of entrained hydrocarbons and reservoir production capabilities can be determined using this data. Often, the imaging is obtained with a downhole logging tool, which is deployed into a well that extends into the subterranean formation. Example downhole tools for imaging include resistivity tools, nuclear magnetic resonance (NMR) devices, and acoustic sensors. Resistivity tools usually include electrodes on one portion of the tool that are energized to emit a current into the formation, which is measured with sensors on another part of the tool. NMR devices release radiation that scatters from the formation, which is analyzed for assessing formation details. Similar to radiation devices, acoustic devices analyze acoustic data that reflects from the formation. Acoustic imaging tools though are susceptible to erroneous readings when the acoustic signals travel from the transmitter along the tool housing and directly to receivers in the tool.

SUMMARY OF THE INVENTION

Disclosed herein are examples of acoustic tools used for imaging in a subterranean wellbore. In one example the tool includes a transmitter, a receiver, and an acoustic isolator disposed between the transmitter and receiver. In this embodiment, the acoustic isolator includes an attenuation element having a rounded end, and a compression element that couples with the rounded end and along a contact interface that defines a curved path. The compression element can include a lock ring having an profiled surface that is oblique to an axis of the acoustic isolator, and wherein the contact interface is on the profiled surface. In this example, the compression element further includes an annular lock nut having a lip that projects radially inward and retains the lock ring in a position to maintain contact between the lock ring and the attenuation element. The compression element may optionally further have an annular sleeve having an end coupled with the lock nut and an opposing end that circumscribes an adjacent attenuation element. In an alternative, the rounded end of the attenuation element is made up of a first end, the attenuation element having a second end distal from the first end and wherein the second end is rounded. In this example, the acoustic isolator may further have a plurality of attenuation elements coupled together in series by a plurality of sleeves and lock rings that have an axial side that is profiled oblique to an axis of the tool to define a profiled side. The contact interface can be between the lock rings and rounded ends of the attenuation elements. In an embodiment, opposing ends of adjacent attenuation elements insert into a one of the sleeves, and wherein lock rings are wedged between opposite ends of each of the sleeves and the opposing ends of adjacent attenuation elements. Lock nuts may be included that are threaded onto the ends of the sleeves for wedging the lock rings against the ends of the attenuation elements. The tool may further include an anti-rotation pin that inserts through a side wall of a sleeve and attaches into the rounded end, so that the attenuation element is rotationally coupled with the sleeve.

Also disclosed herein is an acoustic tool for imaging in a subterranean wellbore that includes an acoustic transmitter, an acoustic receiver spaced axially away from the transmitter, and an elongate attenuation element that is between the transmitter and receiver. The attenuation element includes an end that is spherically shaped, and that is inserted into an open end of a sleeve. A communication path is defined by a transmission of acoustic signals between the transmitter and receiver, and a lock ring contacts the end of the attenuation element. Further, a contact interface between the lock ring and the attenuation element, which follows a curved route, is in the communication path and defines a reduction in cross sectional area of the communication path. In an example, the end of the attenuation element has a first end and a second end that is rounded and inserted into an open end of a sleeve. This example of the tool further includes a multiplicity of attenuation elements, a multiplicity of sleeves and lock rings for coupling the attenuation element in series, and thereby forming a multiplicity of contact interfaces that each attenuate acoustic signals that propagate along the communication path. The tool may further include an oil filled tube inserted into a bore that extends axially through each of the attenuation elements, and lines in the tube that selectively couple with the transmitter and receiver. Optionally, the lock ring spaces the sleeve radially away from the attenuation element.

In another example, an acoustic tool for imaging in a subterranean wellbore is disclosed that includes a tool body, an acoustic transmitter coupled with the body, an acoustic receiver coupled with the body, an acoustic path along the body and between the transmitter and receiver, and a series of acoustic attenuation members that are in the acoustic path and that make up a coupling between adjacent members having a curved interface and that define a substantial decrease in a cross sectional area of the acoustic path. The attenuation members include sleeves, attenuation elements each having opposing ends that are rounded and wherein opposing ends of adjacent attenuation elements insert into open ends of sleeves, and lock rings that retain the ends of the attenuation elements in the sleeves. Lock nuts may further be included that wedge the lock rings against the rounded ends of the attenuation elements. In an alternate embodiment, the curved interface defines a loop that circumscribes an axis of the tool.

BRIEF DESCRIPTION OF DRAWINGS

Some of the features and benefits of the present invention having been stated, others will become apparent as the description proceeds when taken in conjunction with the accompanying drawings, in which:

FIG. 3 is a perspective view of an example of an attenuation element for use with the acoustic isolator of FIG. 2 and in accordance with the present invention.

FIG. 4 is a perspective view of an example of a sleeve for use with the acoustic isolator of FIG. 2 and in accordance with the present invention.

Figure 1:
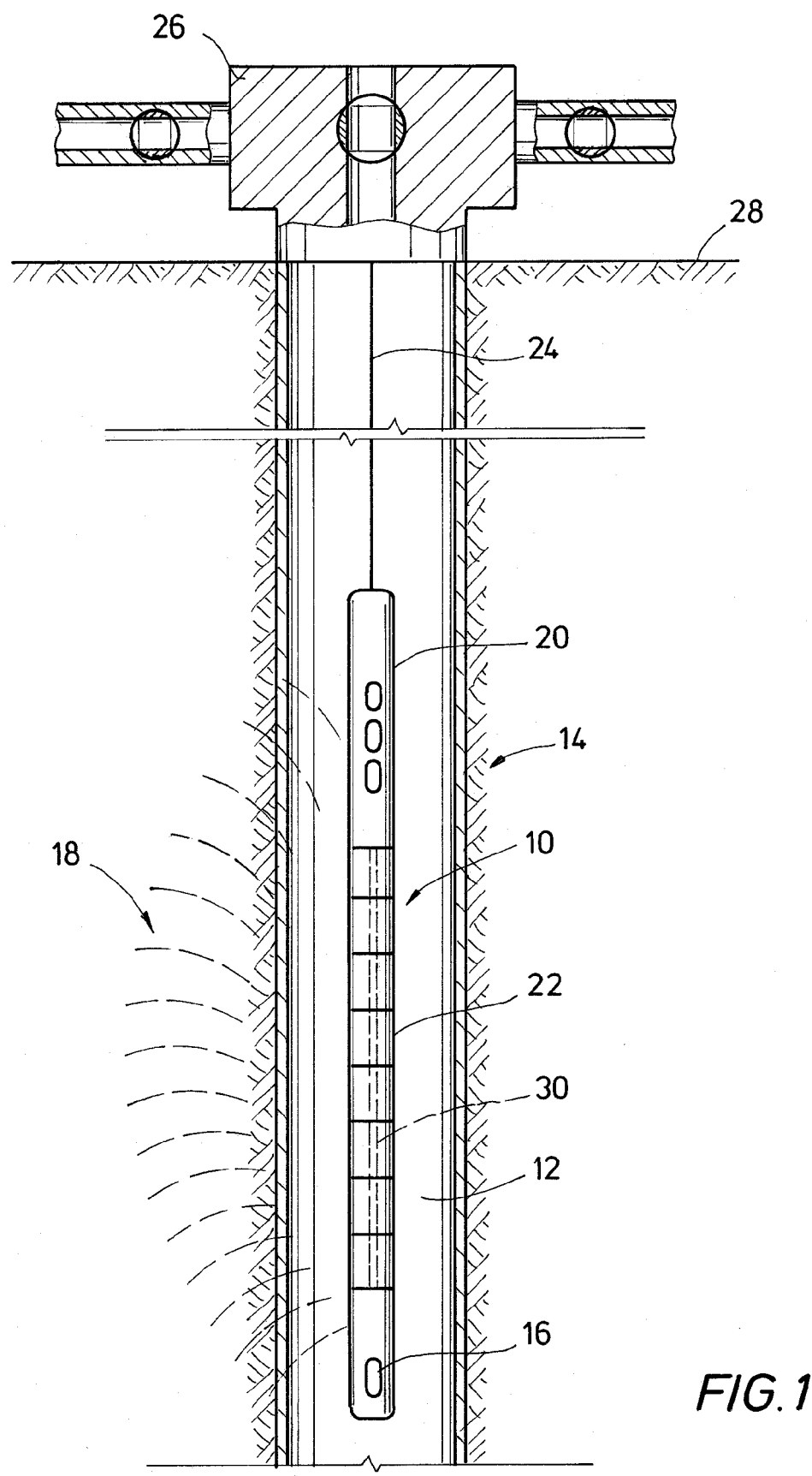
FIG. 1 is side partial sectional view of an example of a logging tool in a wellbore and having an acoustic isolator and in accordance with the present invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 shows in side partial sectional view an embodiment of a downhole tool 10 deployed in borehole 12. In the example of FIG. 1, borehole 12 intersects a subterranean formation 14, where the downhole tool 10 is used for acoustically interrogating the formation 14 from within borehole 12. Included on the body of the downhole tool 10 is a transmitter 16 shown generating acoustic waves 18 that propagate from the tool 10, through borehole 12, and into the formation 14. Some of the acoustic waves 18 reflect from within the formation 14, and propagate back to acoustic receivers 20, shown provided on a part of the tool 10 different where the transmitter 16 is located. The acoustic sensors 20 sense and record the waves 18. As is known, analyzing the waves 18 can yield information about the formation 14; such as the presence and/or amount of hydrocarbons in the formation 14.

An example of an acoustic attenuator 22 is shown included with the tool 10 and disposed between the transmitter 16 and receivers 20. Further in the example of FIG. 1, the downhole tool 10 is deployed on a wireline 24 in the borehole, wherein optionally the wireline 24 can be coiled tubing or any other conveyance means for lowering and raising a tool within the borehole 12. Further shown is a wellhead assembly 26 at the opening to the wellbore 12 and on surface 28. As shown, wireline 24 is threaded through the wellhead assembly 26 from surface and into the wellbore 12.

Figure 2:
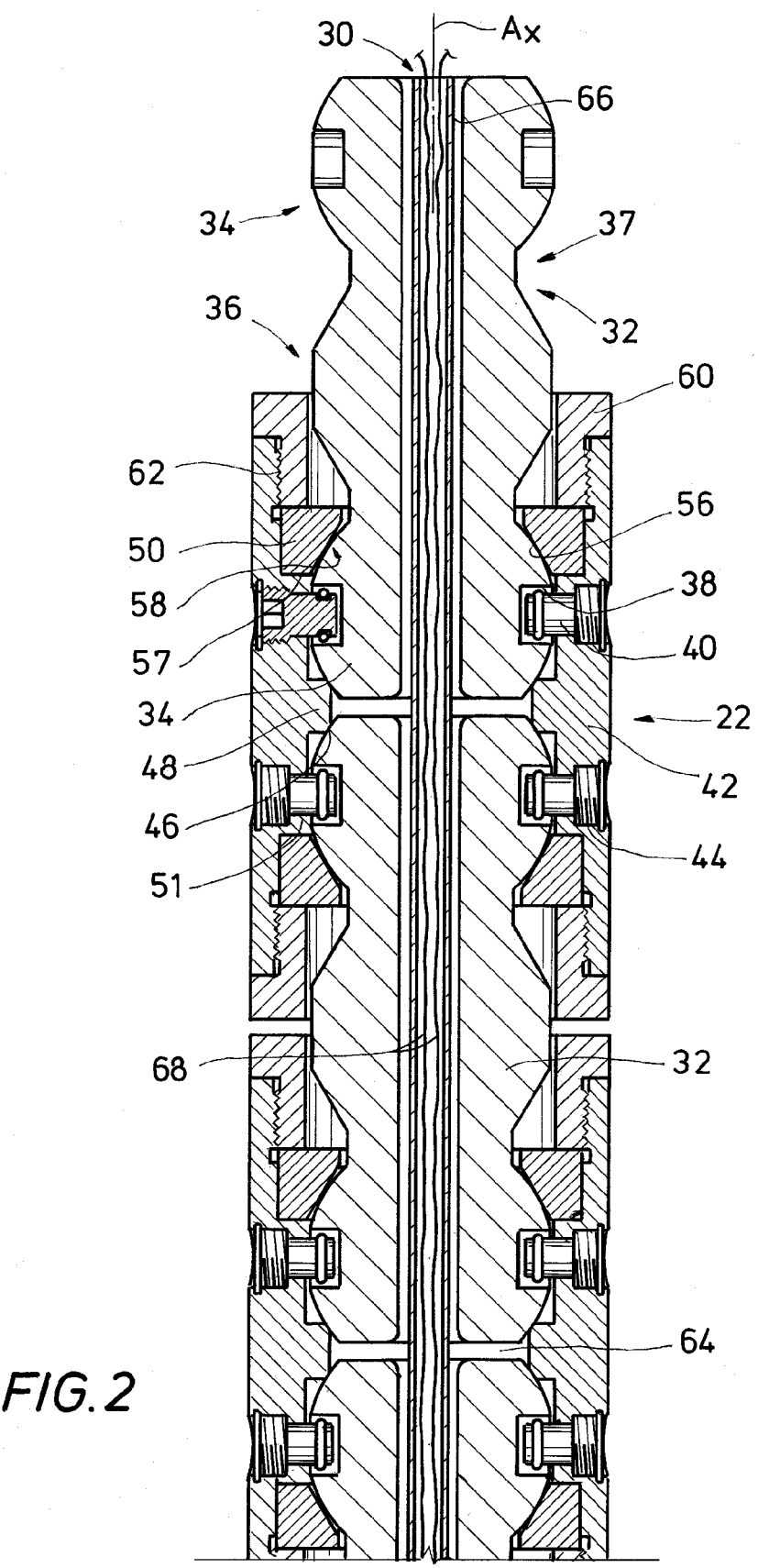
FIG. 2 is a side sectional view of an example of the acoustic isolator of FIG. 1 and in accordance with the present invention.

FIG. 2 provides a side sectional view of an example of the acoustic attenuator 22, which is shown as having a bore 30 that extends therethrough and substantially aligned with an axis $A_x$ of the attenuator 22. Also provided in FIG. 2 are attenuation elements 32, which as shown in perspective view in FIG. 3, are generally elongate elements. Attenuation elements 32 have opposing ends 34, a portion of each of which approximates a spherical shape. The mid portion 36 of the attenuation element 32 of FIGS. 2 and 3 has an outer radius that is about the same as the radius of each of the ends 34 from the axis $A_x$. The radius of the attenuation element 32 decreases between the mid portion 36 and each of the spherical ends 34 to define profiles 37 between these portions of the attenuation element 32. In the example of FIG. 2, each profile 37 has a generally curved shape from its low point and up to the maximum radius portions of each end 34. Whereas the profile 37 increases generally linearly from its low point and to the maximum radius region of the mid portion 36. Keyholes 38 are shown formed radially inward into the attenuation element 32 and from an outer surface of the ends 34.

Referring back to FIG. 2, an anti-rotation pin 40 is shown having a radially inward projecting end that projects into the keyhole 38. An end the anti-rotation pin 40 distal from keyhole 38 is illustrated coupled with a sleeve 42; where sleeve 42 circumscribes respective ends 34 of two adjacent attenuation elements 32. In the example of FIG. 2, inserting the anti-rotation pins 40 through the sleeves 42 and into the attenuation elements 32 limits relative rotation of attenuation elements 32. Openings 44 are provided in the sleeve 42 to allow insertion of the anti-rotation pins 40. Referring now to FIG. 4, a perspective view of the sleeve 42 is shown having the openings 44 formed through its sidewall, and a main bore 46 extending axially through the sleeve 42. A ridge 48 is shown within bore 46 and projects radially inward from the outer surface of the bore 46 and proximate an axial mid portion of the sleeve 42. Further in the embodiment of FIG. 4 are threads 49 formed in the bore 46 and at the outer axial portions of sleeve 42.

Figure 5:
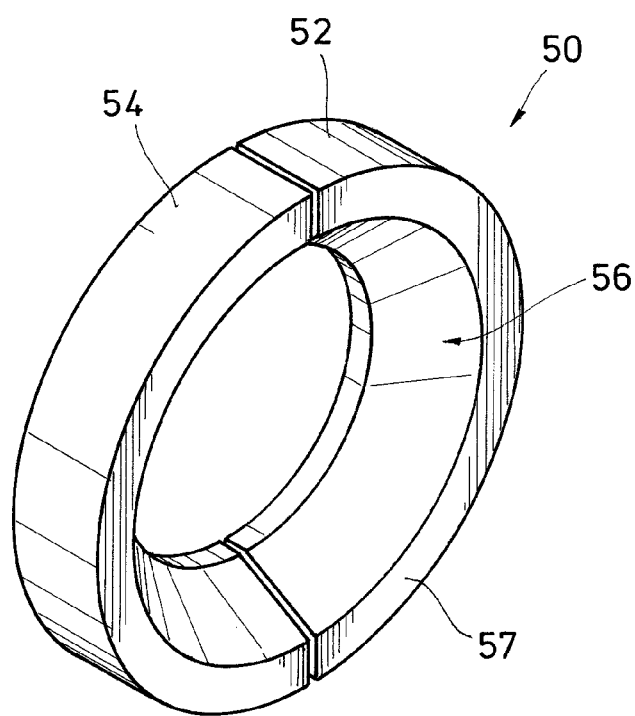
FIG. 5 is a perspective view of an example of a lock ring for use with the acoustic isolator of FIG. 2 and in accordance with the present invention.

Lock rings 50 are shown inserted in spaces between sleeves 42 and outer peripheries of ends 34. As explained in more detail below, the lock rings 50 in combination with the sleeves 42, are used for coupling together adjacent attenuation elements 32. Referring back to FIG. 2, lateral sides of lock rings 50 abut shoulders 51 in sleeves 42 that are defined where the radius of the bore 46 reduces and projects radially inward. As shown in perspective view of FIG. 5, each lock ring 50 is made up of C-shaped halves 52, 54 that when joined as shown form an axial bore 56 through the lock ring 50. Bore 56 tapers radially inward from a lateral side 57 and defines an oblique surface. As shown in FIG. 2, a portion of the oblique surface is in contact with the outer radial surface of the end 34 of attenuation element 32. Strategically profiling the outer surface of end 34 and bore 56 defines a contact interface 58 between lock ring 50 and attenuation element 32. In one example the contact interface extends along a curved path, and may optionally circumscribe axis $A_x$, thereby forming a continuous loop. Referring back to FIG. 1, an advantage of limiting contact between the element 32 and lock ring 50 to a thin contact interface 58 is that the communication path that extends directly between the transmitter 16 and receiver 20 has a significantly reduced cross-sectional area. Reducing the cross-sectional area of the acoustic communication path between the transmitter 16 and receivers 20 significantly attenuates the acoustic signal between the transmitter 16 and receivers 20.

Referring back to FIG. 2, an annular lock nut 60 is shown connected via a threaded connection 62 to the openings of each sleeve 42. An axial end of each lock nut 60 is in contact with a side of lock ring 50 opposite its lateral side 57, thereby axially retaining the lock ring 50 in its place as shown, and in contact with the ends 34 and the attenuation elements 32. Further in the example of FIG. 2, an axial gap 64 is shown between adjacent attenuation elements, wherein in one example wellbore fluid fills the gap 64 thereby enhancing the attenuation capabilities of the acoustic attenuator 22. Optionally, a tube 60 may be inserted into gap 30, and filled with an oil, which in one example may be dielectric. As such, wires 68 can be inserted into the tube 66 and reduce the risk of electrical shorting due to the presence of the dielectric fluid.

Figure 6:
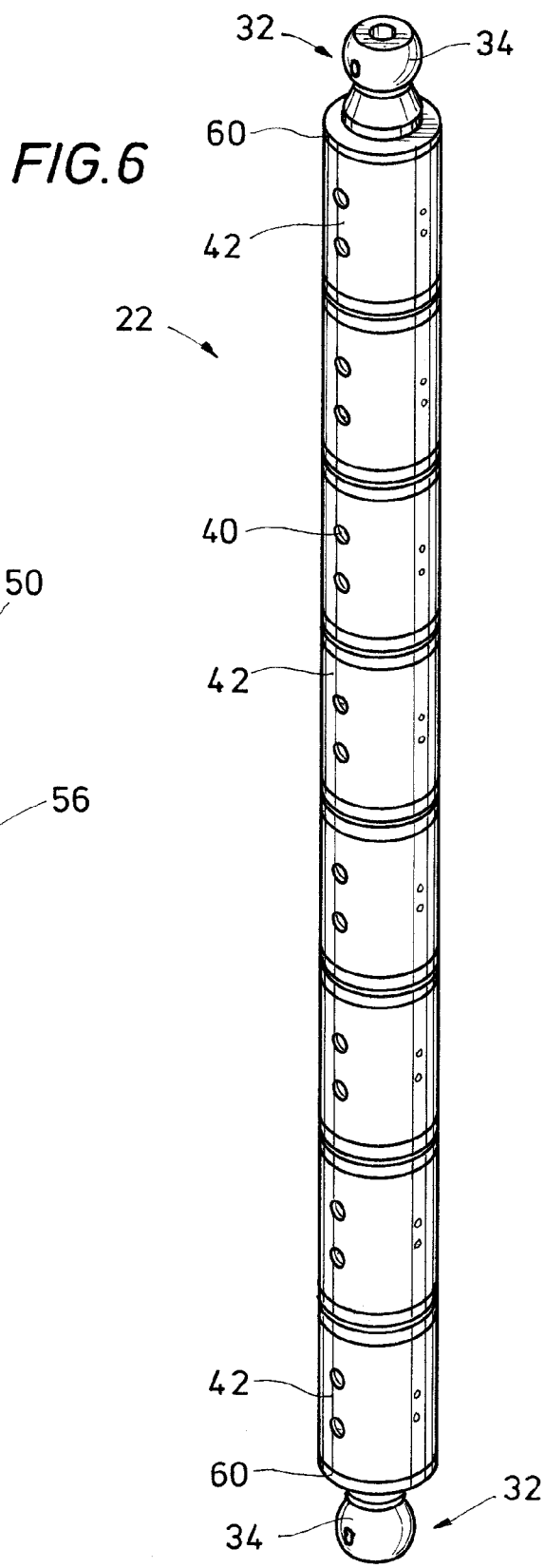
FIG. 6 is a perspective view of an example of the acoustic isolator of FIG. 2 and in accordance with the present invention.

FIG. 6 illustrates in perspective view an assembled example of the acoustic attenuator 22 wherein ends 34 of an attenuation element project axially outward from lock nuts 60 shown threadingly engaged with oppositely located sleeves 42 on the acoustic attenuator 22. In one non-limiting example of operation, the presence of the series of acoustic elements 32 within the acoustic attenuator 22 severely attenuates any waves 18 that may attempt to propagate along the body of the tool 10 so that acoustic events sensed by the receivers 20 can be isolated to those waves 18 that reflect from the formation 14 rather than propagating lengthwise across the body of the tool 10.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. An acoustic tool for imaging in a subterranean wellbore comprising:
   a transmitter;
   a receiver;
   a communication path defined by a transmission of acoustic signals between the transmitter and receiver; and
   an acoustic isolator disposed between the transmitter and receiver that comprises,
      an attenuation element having a rounded end,
      a compression element that couples with the rounded end and along a contact interface that defines a curved path, is in the communication path, and that defines a reduction in cross sectional area of the communication path.

2. The tool of claim 1, wherein the compression element comprises a lock ring having a profiled surface that is oblique to an axis of the acoustic isolator, and wherein the contact interface is on the profiled surface.

3. The tool of claim 2, wherein the compression element further comprises an annular lock nut having a lip that projects radially inward and retains the lock ring in a position to maintain contact between the lock ring and the attenuation element.

4. The tool of claim 2, wherein the compression element further comprises an annular sleeve having an end coupled with the lock nut and an opposing end that circumscribes an adjacent attenuation element.

5. The tool of claim 1, wherein the rounded end of the attenuation element comprises a first end, the attenuation element having a second end distal from the first end and wherein the second end is rounded.

6. The tool of claim 5, acoustic isolator further comprises a plurality of attenuation elements coupled together in series by a plurality of sleeves and lock rings that have an axial side that is profiled oblique to an axis of the tool to define a profiled side.

7. The tool of claim 6, wherein the contact interface is between the lock rings and rounded ends of the attenuation elements.

8. The tool of claim 6, wherein opposing ends of adjacent attenuation elements insert into a one of the sleeves, and wherein lock rings are wedged between opposite ends of each of the sleeves and the opposing ends of adjacent attenuation elements.

9. The tool of claim 8, further comprising lock nuts threaded onto the ends of the sleeves for wedging the lock rings against the ends of the attenuation elements.

10. The tool of claim 1, further comprising an anti-rotation pin that inserts through a side wall of a sleeve and attaches into the rounded end, so that the attenuation element is rotationally coupled with the sleeve.

11. An acoustic tool for imaging in a subterranean wellbore comprising:
   an acoustic transmitter;
   an acoustic receiver spaced axially away from the transmitter;
   an elongate attenuation element that is between the transmitter and receiver, and that comprises an end that is spherically shaped, and that is inserted into an open end of a sleeve;
   a communication path defined by a transmission of acoustic signals between the transmitter and receiver;
   a lock ring that contacts the end of the attenuation element; and
   a contact interface between the lock ring and the attenuation element that follows a curved route, is in the communication path, and that defines a reduction in cross sectional area of the communication path.

12. The tool of claim 11, wherein the end of the attenuation element comprises a first end, the attenuation element further comprising a second end that is rounded and inserted into an open end of a sleeve, the tool further comprising a multiplicity of attenuation elements, a multiplicity of sleeves and lock rings for coupling the attenuation element in series, and thereby forming a multiplicity of contact interfaces that each attenuate acoustic signals that propagate along the communication path.

13. The tool of claim 12, wherein the lock ring spaces the sleeve radially away from the attenuation element.

14. The tool of claim 11, further comprising an oil filled tube inserted into a bore that extends axially through each of the attenuation elements, and lines in the tube that selectively couple with the transmitter and receiver.

15. An acoustic tool for imaging in a subterranean wellbore comprising:
   a tool body;
   an acoustic transmitter coupled with the body;
   an acoustic receiver coupled with the body;
   an acoustic path along the body and between the transmitter and receiver;
   an acoustic isolator comprising:
      a series of acoustic attenuation members that are in the acoustic path, and
      a series of compression elements that couple adjacent acoustic attenuation members, the interface between the compression elements and each respective acoustic attenuation member being curved, and defining a substantial decrease in a cross sectional area of the acoustic path.

16. The acoustic tool of claim 15, wherein the attenuation members comprise sleeves, attenuation elements each having opposing ends that are rounded and wherein opposing ends of adjacent attenuation elements insert into open ends of sleeves, and lock rings that retain the ends of the attenuation elements in the sleeves.

17. The acoustic tool of claim 16, further comprising lock nuts that wedge the lock rings against the rounded ends of the attenuation elements.

18. The acoustic tool of claim 15, wherein the curved interface comprises a loop that circumscribes an axis of the tool.

* * * * *